United States Patent [19]
Takagi

[11] Patent Number: 5,352,853
[45] Date of Patent: Oct. 4, 1994

[54] CABLE MOUNTING STRUCTURE FOR AUTOMATIC TRANSMISSION

[75] Inventor: Kazuo Takagi, Tokyo, Japan

[73] Assignee: Jatco Corporation, Fuji, Japan

[21] Appl. No.: 948,487

[22] Filed: Sep. 22, 1992

[30] Foreign Application Priority Data

Sep. 27, 1991 [JP] Japan .............. 3-087006[U]

[51] Int. Cl.⁵ .......................................... H01R 13/52
[52] U.S. Cl. ................... 174/65 R; 174/152 R
[58] Field of Search ............... 174/65 R, 151, 152 R, 174/152 G; 248/56; 310/88, 89

[56] References Cited

U.S. PATENT DOCUMENTS

| 1,426,210 | 8/1922 | O'Neil | 174/65 R |
| 3,761,601 | 9/1973 | Kaesser et al. | 174/65 R X |
| 4,454,381 | 5/1984 | Ito et al. | 174/151 |
| 4,599,487 | 7/1986 | Blank et al. | 174/151 |

FOREIGN PATENT DOCUMENTS

| 3232050A1 | 3/1983 | Fed. Rep. of Germany . |
| 222169A5 | 5/1985 | Fed. Rep. of Germany . |
| 3412786C2 | 10/1985 | Fed. Rep. of Germany . |
| 1-59467 | 12/1989 | Japan . |
| 2145579A | 3/1985 | United Kingdom . |

Primary Examiner—Leo P. Picard
Assistant Examiner—David Tone
Attorney, Agent, or Firm—Foley & Lardner

[57] ABSTRACT

A terminal case is sealingly fitted in an opening formed in a case of a transmission. The terminal case is formed with a partition wall by which the interior of the case is divided into inside and outside bore parts which are respectively exposed to the interior of the transmission and the outside of the transmission. The partition wall is formed with a plurality of apertures through which electric wires extend. Each of the electric wires within the outside bore part is provided with an enlarged stopper member whose size is larger than that of the corresponding aperture of the partition wall. A plastic adhesive is packed in the outside bore part in a manner to surround all the stopper members.

14 Claims, 3 Drawing Sheets

CABLE MOUNTING STRUCTURE FOR AUTOMATIC TRANSMISSION

BACKGROUND OF THE INVENTION

1. Field of the Invention

The present invention relates in general to automatic transmissions of automobiles, and more particularly to an electric cable mounting structure for such automatic transmissions. More specifically, the present invention is concerned with a mounting structure for an electric cable by which respective electric devices mounted in and outside the transmission are electrically connected.

2. Description of the Prior Art

In automatic transmissions for motor vehicles, there is an internal electric device, such as a device including solenoid valves, which is installed in the transmission, an external electric device, such as an electronic controller, which is arranged outside of the transmission, and an electric cable which extends between the internal and external electric devices for transmitting control signals from the external control device to the internal controlled device. The electric cable includes a plurality of wires which are bundled. Usually, the case of the transmission is formed with an opening for inserting the electric cable into the transmission case therethrough. A suitable seal device is fitted to the opening of the transmission for sealing the same.

In order to fix the electric cable to the case of the transmission, various measures have been hitherto proposed and put into practical use. One of these measures is disclosed in Japanese Patent Second Provisional Publication 1-59467, which is shown in FIG. 5 of the accompanying drawings.

In order to clarify the task of the present invention, the conventional measure disclosed by the publication will be described with reference to the drawing in which the cable mounting structure is denoted by numeral 1.

In FIG. 5, denoted by numeral 2 is an aluminium case of an automatic transmission, denoted by numeral 3 is a sleeve for bundling outside electric wires 27, and denoted by numeral 9 is an opening formed in the transmission case 2.

Denoted by numeral 10 is a cylindrical terminal case intimately plugged in the opening 9. Each of the outside wires 27 includes a metal wire covered with a plastic, such as, polyethylene or the like. The outside wires 27 extend to an electronic controller (not shown) located outside of the transmission. The terminal case 10 is constructed of a resilient, oilproof, heat resistant plastic material, such as 6-6 NYLON (trade name) or the like. The terminal case 10 is formed at its inward end with a sleeve portion 11 directed toward the interior of the transmission case 2. The sleeve portion 11 is formed with a plurality of resilient tabs 13 provided by forming a plurality of cuts in the sleeve portion 11. The tabs 13 are resiliently hooked to a shoulder portion (no numeral) formed in the opening 9. The terminal case 10 is formed at its middle portion with an annular flange 12 which is hooked to an outward end of the opening 9 of the case 2. Thus, the terminal case 10 is tightly fixed to the opening 9 due to the work of the tabs 13 and the annular flange 12.

Designated by numeral 14 is an annular groove formed in the terminal case 10. Received in the annular groove 14 is an O-ring 24 for achieving sealing between the transmission case 2 and the terminal case 10. The terminal case 10 is formed at its front end with an annular raised portion 15. Detachably engaged with the annular raised portion 15 is a rubber cover 22. Designated by numeral 16 is a cylindrical space defined in a forward part of the terminal case 10, and denoted by numeral 16a is a cylindrical bore of the terminal case 10 positioned near the sleeve portion 11. Designated by numeral 17 is a cylindrical space defined in a rearward part of the terminal case 10. Intimately installed in the cylindrical bore 16a is a rubber bush 23 which is formed with a plurality of apertures (no numeral) through which electric inside wires 26 extending from the outside wires 27 pass. The inside electric wires 26 extend into the interior of the transmission case 2 and are connected with solenoid valves (not shown) of the internal electric device, each inside wire 26 including a metal wire covered with a heat resistant and oilproof plastic material, such as TEFLON (trade name) or the like. Designated by numeral 25 are press couplers by which the inside wires 26 and the corresponding outside wires 27 are fixedly coupled in one-to-one relationship. The couplers 25 are embedded in an adhesive material 28 packed in the front part of the cylindrical bore 16a of the terminal case 10. Designated by numeral 41 is a naked part of each inside wire 26, while, designated by numeral 42 is a naked part of each inside wire 27.

The above-mentioned cable mounting structure 1 is provided by taking the following assembling steps.

The inside wires 26 which have been connected to the respective solenoid valves in the transmission have their outside ends drawn out through the opening 9 of the transmission case 2 and then the outside ends of the wires 26 are passed through apertures (no numerals) formed in the rubber bush 23 and drawn out therefrom. The plastic cover (viz., the TEFLON sleeve) of the outside end of each inside wire 26 is removed to expose the conducting wire 41. While, the outside wires 27 which have been connected to the electronic controller arranged outside of the transmission have their inside ends passed through a passage (no numeral) of the rubber cover 22 and drawn out from the same. The plastic cover (viz., polyethylene sleeve) of the inside end of each outside wire 27 is removed to expose the conducting wire 42. The exposed ends of the wires 41 and 42 are put in an untreated press coupler 25, and the coupler 25 is pressed to couple the wires 41 and 42. Then, the rubber bush 23 is inserted into the bore 16a of the terminal case 10 from the sleeve portion 11. Thereafter, uncured plastic adhesive 28 is poured into a remaining space in the terminal case 10 in a manner to surround all the couplers 25 and the naked parts of the wires 41 and 42. The adhesive 28 is an electrically insulating, heat resistant and oilproof plastic material, such as epoxy resin, silicone resin or the like. The adhesive 28 is cured to assure fixation of each coupler 25 in the terminal case 10. Then, the rubber cover 22 which has been received on the bundled outside cables 27 is brought into a latching engagement with the annular raised portion 15 of the terminal case 10. Then, the O-ring 14 is put in the annular groove 14 of the terminal case 10, and the terminal case 10 is inserted into the opening 9 of the transmission case 2. When the terminal case 10 is sufficiently inserted into the opening 9, the resilient tabs 13 of the case 10 are spreaded radially outward and latchingly engaged with the shoulder portion of the opening 9 of the transmission case 2. With these steps, the cable mounting structure 1 is provided and the terminal case 10 is tightly connected to the opening 9 assuring sealing therebetween.

However, due to its construction, the above-mentioned conventional cable mounting structure has the following inherent drawbacks.

First, the manual coupling of the two wires 26 and 27 with the coupler 25 is difficult, which reduces the labor effectiveness in producing the transmission.

Second, due to the awkward task of coupling the inside and outside wires 26 and 27, a so-called mis-coupling between the two wires tends to occur.

SUMMARY OF THE INVENTION

It is therefore an object of the present invention to provide a cable mounting structure for an automatic transmission, which is free of the above-mentioned drawbacks.

According to the present invention, there is provided a cable mounting structure which is used in an arrangement including a case of an automatic transmission, a first electric device arranged outside of the transmission case, a second electric device arranged in the transmission case, and a plurality of electric wires extending between the first and second electric devices through an opening formed in the transmission case. The cable mounting structure comprises a terminal case sealingly fitted in the opening, the terminal case including a partition wall by which the interior of the case is divided into inside and outside bore parts, the inside bore part being exposed to the interior of the transmission case and the outside bore part being exposed to the outside of the transmission case; means for defining in the partition wall a plurality of apertures through which the electric wires extend; stopper members provided on the electric wires within the outside bore part of the terminal case, the side of each stopper member being larger than that of the corresponding aperture in the partition wall; and a plastic adhesive packed in the outside bore part in a manner to surround all the stopper members.

BRIEF DESCRIPTION OF THE DRAWINGS

Other objects and advantages of the present invention will become apparent from the following description when taken in conjunction with the accompanying drawings, in which.

DETAILED DESCRIPTION OF THE INVENTION

Figure 1:
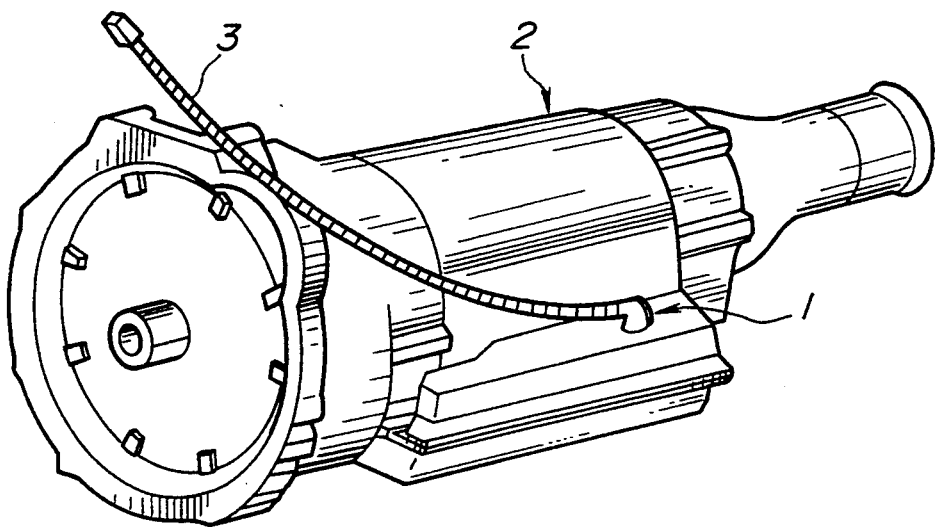
FIG. 1 is a perspective view of an automatic transmission to which the present invention is practically applied.

Referring to FIG. 1, there is shown an automotive automatic transmission to which the present invention is practically applied. In the drawing, denoted by numeral 1 is a cable mounting structure of the present invention, denoted by numeral 2 is the transmission, and denoted by numeral 3 is an elongate sleeve which receives therein electric wires 126 (see FIG. 2).

Figure 2:
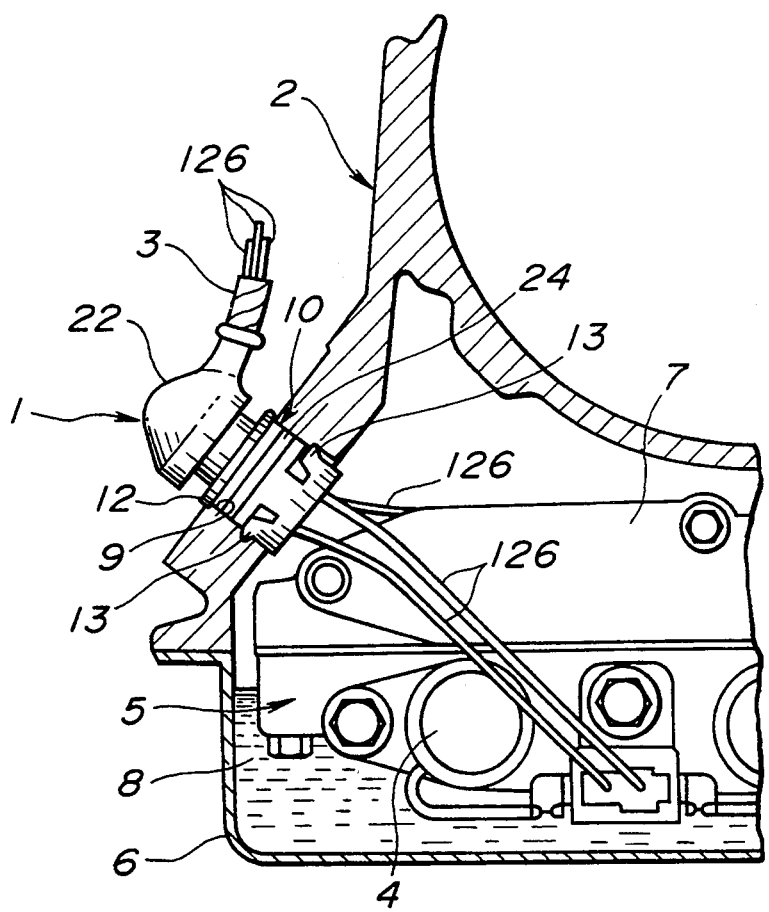
FIG. 2 is a sectional view of the transmission at the position where a cable mounting structure of the present invention is provided.

As is seen from FIG. 2, the transmission case 2 is formed with an opening 9 through which the electric wires 126 are inserted into an oil pan 6 of the transmission. The electric wires 126 are connected to solenoid valves 4 submerged in the oil 8 in the oil pan 6. Denoted by numeral 5 is a hydraulic pressure control device which has a case 7. Unlike the above-mentioned conventional structure, each wire 126 for connecting the external and internal electric devices is of a one-piece wire. That is, the wire 126 includes a metal wire covered with a heat resistant and oilproof plastic material. Preferably, the wire 126 is a fluororesin-covered cable "FLUBON FRW (trade name)" manufactured by KURABE INDUSTRIAL CO., LTD.

Denoted by numeral 3 is an elongate sleeve which receives therein outside portions of the electric wires 126.

Figure 3:
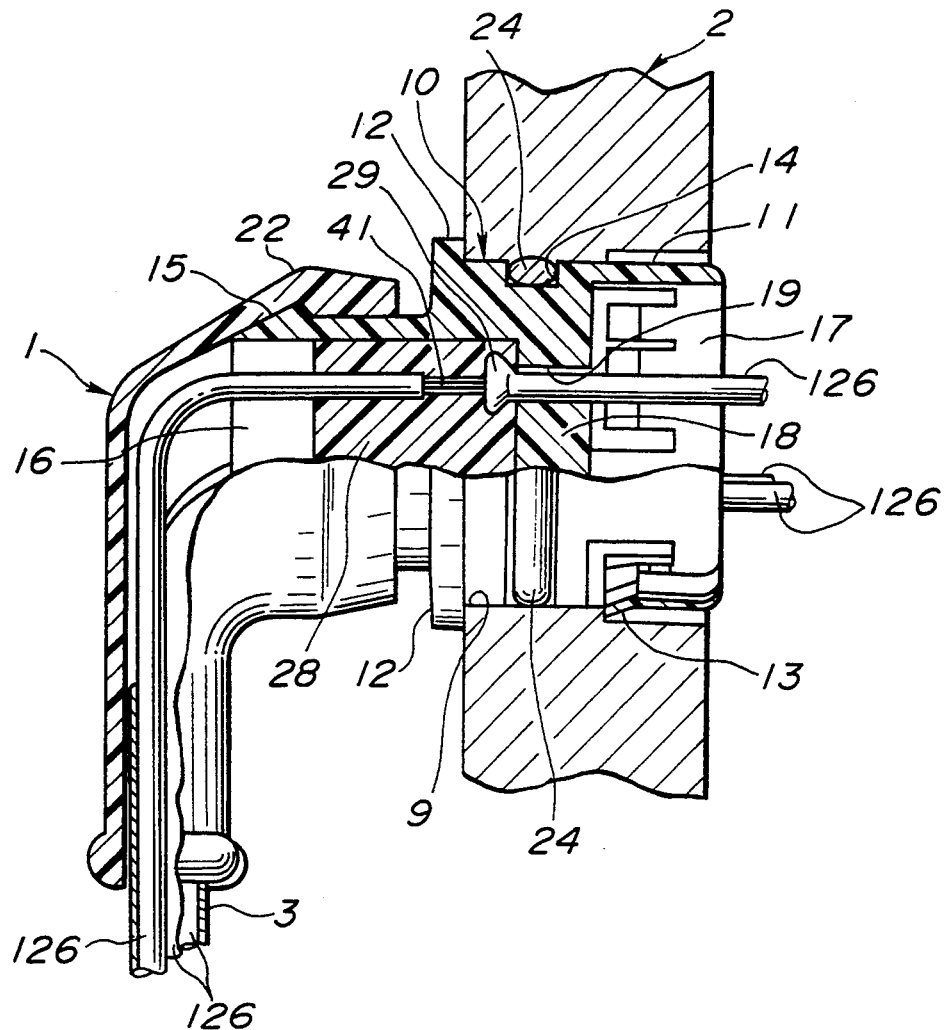
FIG. 3 is an enlarged sectional view of the cable mounting structure of the present invention.

As is seen from FIG. 3, the opening 9 of the transmission case 2 has a terminal case 10 received therein. The terminal case 10 is constructed of a resilient, oilproof, heat resistant plastic, such as 6-6 NYLON (trade name) or the like. The terminal case 10 is formed at its inward end with a sleeve portion 11 directed toward the interior of the transmission case 2. The sleeve portion 11 is formed with a plurality of resilient tabs 13 provided by forming a plurality of cuts in the sleeve portion 11. The tabs 13 are resiliently hooked to a shoulder portion (no numeral) formed in the opening 9. The terminal case 10 is formed at its middle portion with an annular flange 12 which is hooked to an outward end of the opening 9 of the transmission case 2. Thus, the terminal case 10 is tightly fixed to the opening 9 due to the work of the tabs 13 and the annular flange 12.

In the present invention, the cylindrical terminal case 10 is formed at its generally middle portion with a partition wall 18 by which the cylindrical interior space of the terminal case 10 is divided into inside and outside parts 17 and 16. The partition wall 18 is formed with a plurality of apertures 19 (only one is shown in FIG. 3) through which the electric wires 126 pass. Preferably, each aperture 19 has a diameter substantially equal to the diameter of the wire 126. Designated by numeral 14 is an annular groove formed in the terminal case 10. The annular groove 14 has an O-ring 24 put therein for achieving sealing between the transmission case 2 and the terminal case 10. The terminal case 10 is formed at its front end with an annular raised portion 15. Detachably engaged with the annular raised portion 15 is a rubber cover 22 through which the wires 126 pass.

Designated by numeral 29 is an enlarged stopper portion formed by the plastic cover of each wire 126. As will become apparent as the description proceeds, such stopper portion 29 is provided by heat-melting the plastic cover and shaping the same. Each stopper portion 29 is larger enough than the diameter of the corresponding aperture 19 of the partition wall 18 of the terminal case 10. Designated by numeral 41 is a naked part of the wire 126, which is inevitably provided by the heat-melting. The outside part 16 of the cylindrical bore of the terminal case 10 has an adhesive material 28 packed therein. As shown, the enlarged stopper portion 29 and its neighborhood portion of the wire 126 are embedded in the adhesive material 28.

The cable mounting structure 1 of the present invention is provided by taking the following assembling steps.

The electric wires 126 which have been connected to the solenoid valves 4 (see FIG. 2) in the transmission are drawn out through the opening 9 of the transmission case 2 and then passed through the terminal wall 10, more particularly, through the apertures 19 formed in the partition wall 18 of the terminal case 10 and drawn out therefrom. The wires 126 are then connected to the electronic controller arranged outside of the transmission.

Then, the wires 126 located within the inside part 16 of the cylindrical bore of the terminal case 10 are subjected to a heat-melting to form the enlarged stopper portions 29. If the wire 126 has an outer diameter of about 1.7 mm, the enlarged stopper portion 29 is so made as to leave the naked part 41 of the wire of about 3 mm in length. Due to the melting of the plastic cover of the wire 126, the plastic stopper portion 29 is fixedly attached to the naked metal wire 41. With provision of such enlarged stopper portions 29, the wires 126 are prevented from being accidentally drawn into the transmission case during the assembling procedure. Then, uncured plastic adhesive 28 is poured into the inside part 16 of the terminal case 10 in a manner to surround all the enlarged stopper portions 29 and the naked parts 41 of the wires 126. Preferably, the plastic adhesive 28 is the "XN-1263-2 (trade name)" manufactured by JAPAN Ciba-Geigy Co., Ltd. The adhesive 28 is cured to assure fixation of the wires 126 in the terminal case 10. Then, the rubber cover 22 which has been received on the wires 126 is hooked to the annular raised portion 15 of the terminal case 10. Then, the O-ring 14 is put into the annular groove 14 of the terminal case 10, and the terminal case 10 is inserted into the opening 9 of the transmission case 2. When the terminal case 10 is sufficiently inserted into the opening 9, the resilient tabs 13 of the case 10 are spread radially outward and latchingly engaged with the shoulder portion of the opening 9 of the transmission case 2. With these steps, the cable mounting structure 1 of the present invention is provided and the terminal case 10 is tightly connected to the opening 9 assuring a water-tight sealing therebetween.

Figure 4:
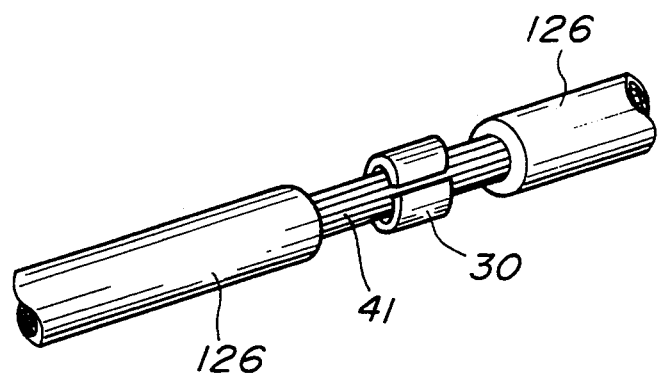
FIG. 4 is a perspective view of a cable stopper fixed to an electric wire, which is usable in the present invention.

Referring to FIG. 4, there is shown a modified electric wire 126 which is also usable in the present invention. In this modification, a separate stopper or clip member 30 is fixed to the naked part 41 of the wire 126. Of course, the size of the stopper 30 is larger enough than that of the aperture 19 (see FIG. 3) of the partition wall 18 of the terminal case 10.

In the following, advantages of the present invention will be described.

Figure 5:
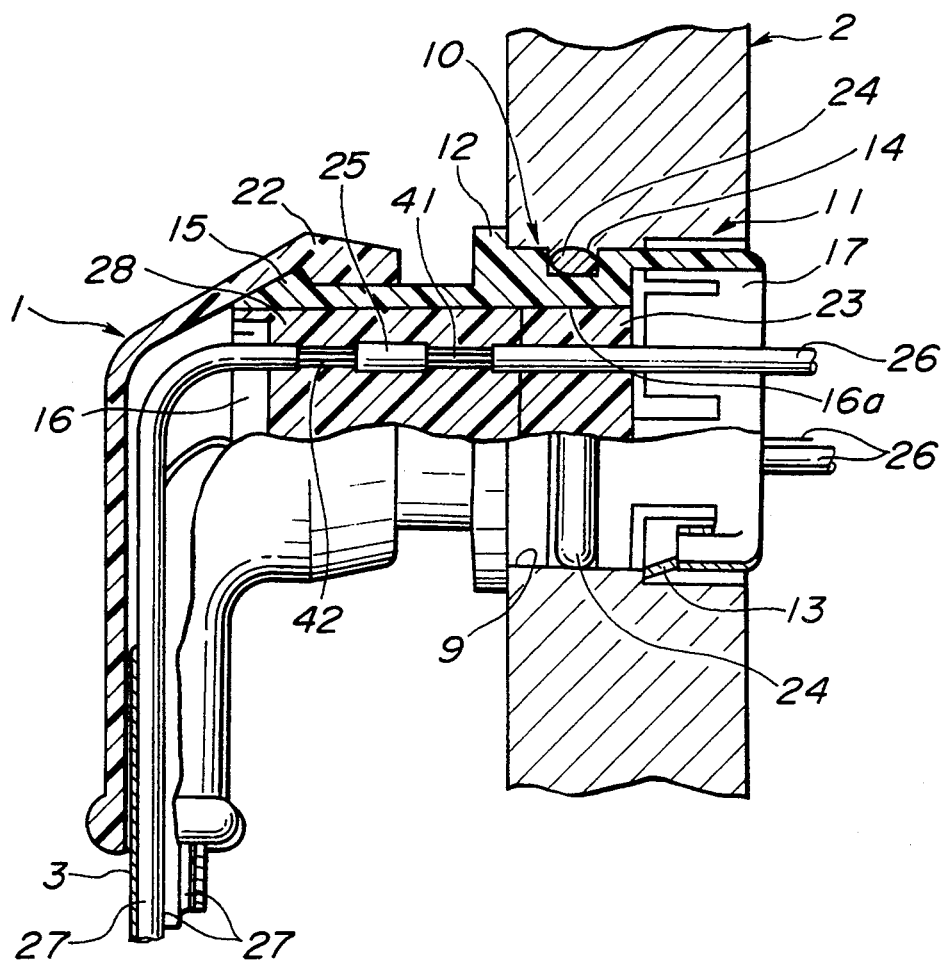
FIG. 5 is a view similar to FIG. 3, but showing a conventional cable mounting structure.

First, since each electric wire 126 used for connecting the internal and external electric devices is of a so-called one-piece wire, there is no need of using the wire coupler 25 (see FIG. 5) whose handling is troublesome. Thus, the labor effectiveness in producing the transmission is improved.

Second, because of the stopper portions 29 or 30 provided on the wires 126, the wires 126 are prevented from accidentally being drawn into the transmission case 2 during the procedure of assembling the cable mounting structure 1.

Third, because of using the one-piece wire 126, the mis-coupling between the inside and outside wires, which would occur in the conventional structure, never occurs.

What is claimed is:

1. An arrangement comprising a transmission case of an automatic transmission, a first electric device arranged outside of said transmission case, a second electric device arranged in said transmission case, a plurality of electric wires extending between said first and second electric devices through an opening formed in said transmission case, and a cable mounting structure including a terminal case sealingly fitted in said opening, said terminal case having therein a partition wall which is formed with a plurality of apertures through which said electric wires extend, wherein:

each of said electric wires is a one-piece wire which includes a one-piece metal wire extending between said first and second electric devices and a plastic cover substantially covering said one-piece metal wire;

said partition wall is integral with said terminal case;

each of said electric wires located within said terminal case has a naked part which is provided by removing a part of said plastic cover; and a plastic adhesive material is packed in said terminal case and embeds therein said naked parts of said electric wires.

2. An arrangement as claimed in claim 1, wherein a part of said plastic cover is peeled to provide a naked part and said peeled part of said plastic cover is melted to form an enlarged portion on said plastic cover.

3. An arrangement as claimed in claim 2, wherein said enlarged portion is larger than a corresponding aperture in said partition wall.

4. An arrangement as claimed in claim 1, further comprising a stopper member provided on each electric wire within said terminal case, each stopper member being larger than a corresponding aperture in said partition wall.

5. An arrangement as claimed in claim 4, wherein each stopper member is provided by heat-melting a part of said plastic cover of each corresponding electric wire.

6. An arrangement as claimed in claim 1, wherein said plastic cover of each electric wire is constructed of heat resistant and oilproof plastic material.

7. An arrangement as claimed in claim 1, wherein said plastic adhesive is an electrically insulating, heat resistant and oilproof plastic material.

8. An arrangement as claimed in claim 1, further comprising a clip member provided on each naked part whose size is larger than that of a corresponding aperture in said partition wall.

9. An arrangement as claimed in claim 1, wherein:

said partition wall divides the interior of said terminal case into inside and outside bore parts, said inside bore part being exposed to the interior of said transmission case and said outside bore part being exposed to the outside of said transmission case; and wherein said naked parts of said electric wires and said plastic adhesive material are packed in said outside bore part of said terminal case.

10. In an arrangement including a transmission case of an automatic transmission, a first electric device arranged outside of the transmission case, a second electric device arranged in the transmission case, and a plurality of electric wires extending between said first and second electric devices through an opening formed in the transmission case, a cable mounting structure comprising:

a terminal case sealingly fitted in said opening, said terminal case including a partition wall by which the interior of said terminal case is divided into inside and outside bore parts, said inside bore part being exposed to the interior of said transmission case and said outside bore part being exposed to the outside of the transmission case;

means for defining in said partition wall a plurality of apertures through which said electric wires extend;

stopper members provided on said electric wires within said outside bore part of said terminal case, a side of each stopper member being larger than that of a corresponding aperture in the partition wall, each of said stopper members being an enlarged portion which is provided by heat-melting a plastic cover of a corresponding electric wire; and a plastic adhesive packed in said outside bore part in a manner to surround all the stopper members.

11. A cable mounting structure as claimed in claim 10, wherein said enlarged portion of the wire plastic cover is provided by peeling a part of the wire plastic cover and melting the same.

12. A cable mounting structure as claimed in claim 11, wherein each of said electric wires is of a one-piece wire which includes a one-piece metal wire extending between said first and second electric devices and a plastic cover entirely covering said metal wire.

13. A cable mounting structure as claimed in claim 12, wherein said plastic cover of said electric wire is constructed of heat resistant and oilproof plastic material.

14. A cable mounting structure as claimed in claim 13, wherein said plastic adhesive is an electrically insulating, heat resistant and oilproof plastic material.

* * * * *